United States Patent Office 3,222,045
Patented Dec. 7, 1965

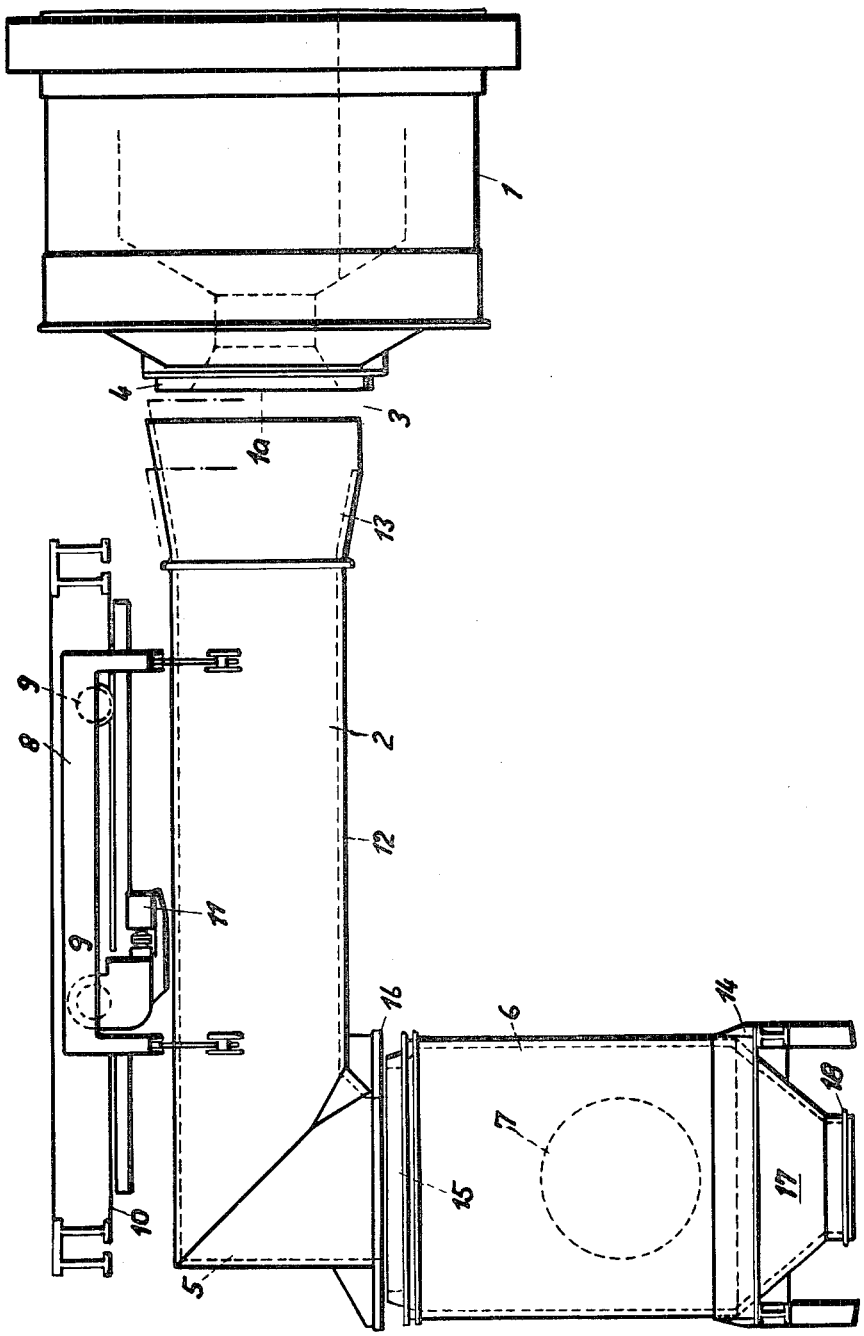

3,222,045
METHOD AND APPARATUS FOR WASTE HEAT ECONOMY IN ROTARY CONVERTER PLANTS
Edgar Spetzler, Oberhausen, Rhineland, Germany, assignor to Huttenwerk Oberhausen A.G., Oberhausen, Germany
Filed Nov. 19, 1962, Ser. No. 238,365
Claims priority, application Germany, Jan. 10, 1962, H 44,570
5 Claims. (Cl. 266—35)

For the economy of waste heat in converter plants it is known that the waste converter gas can be fed into boiler-like heat exchangers which are usually placed in the converter flue, or that the converter flue can be provided with a high-temperature fluid cooling in which the cooling medium, usually steam, transfers its received heat to a consuming device through heat exchangers.

In such equipment for waste-heat economy it is necessary on the one hand to prevent the waste converter gases from taking too much air with them, which would have the bad effect of cooling the waste converter gases. On the other hand, the amounts of carbon monoxide carried with the waste converter gases must be burned out with the air supplied in order to obtain all the heat present in the gas. In addition the cinders or slags which are carried along must be separated, since they must not settle on the heat exchanging surfaces of the heat exchanger.

In order to prevent the carrying along of too much air, it is known that waste gas pipes or collecting funnels can be installed to rotate around a horizontal axis at the mouth of pear-shaped converters (Thomas converters). However the known measures permit no, or at least no simple, regulation of the amount of air, which must be altered according to the amount of the carbon monoxide content of the waste converter gas in order to produce an optimum heat efficiency from the waste gas in converting.

I also know of the so-called rotor process, in which the work is done with barrel-like converter tanks called rotor converters, whose barrel axis is placed essentially horizontally, while the converting material is introduced axially and the waste converter gases also go out axially. Equipment for efficiency of waste heat permitting a simple regulation of the air supply to the waste converter gases, is not known in such rotor-converter plants.

The invention has as its object to provide an apparatus and method with which, especially in rotary converter plants, a maximum of waste heat can be extracted in heat exchangers connected at the outlet side.

The invention provides an apparatus for the economy of waste heat in rotor converter plants. The apparatus according to the invention is characterized by an essentially horizontal waste gas pipe which is movable axially, one end of which is placed in front of the waste gas exit opening of the rotor converter, with the interpolation of an air inlet slit which is adjustable by moving the waste gas pipe axially, while the other end discharges into a cinder or slag-collecting chamber with a flue gas outlet, by means of an elbow pipe. This slag-collecting chamber is then connected at the outlet side with the heat exchanger.

The invention can be operated in detail in various ways. For example, it is recommended that the waste gas pipe be placed adjustably under a fixed beam by means of a suspension device with rollers or the like, and with a motor controlling the adjusted position of the pipe. The drive motor can then be connected into a control circuit in such a way that the air slit or entry can be controlled according to the amount of the carbon monoxide content of the converter gases. Thus in this way the burning out of the carbon monoxide in the waste converter gases can be controlled. In addition the waste gas pipe should also be provided with a refractory lining. It is also recommended that the air entry end of the waste gas pipe be made funnel-shaped.

In the apparatus according to the invention it is also preferable that the slag-collecting chamber be made stationary and provided with an opening alined with the mouth of the elbow pipe. It may be advantageous to provide a shielding flange for the elbow pipe opening so that sufficient tightness is ensured between the slag-collecting chamber and waste gas pipe by means of the elbow pipe. Preferably the slag-collecting chamber also has a funnel-shaped bottom with a slag outlet which can be closed by a slide or the like.

The chief advantage of the invention is that a control of the air entry into the waste converter gases in a rotor converter-heat exchanger assembly can be accomplished in a simple manner and at low expense. The heat efficiency of the so-called rotor process is thus appreciably improved.

The invention is explained in greater detail by means of a drawing presenting one example of an operative embodiment.

The single figure of the drawing shows a side view of an apparatus according to the invention and applied to effect high waste-heat economy of rotor converters. The rotor converter 1 is indicated at the right of the drawing. The apparatus itself consists of a waste gas pipe 2 lying substantially horizontally and axially adjustable. One end of this waste gas pipe 2 is placed in front of the somewhat smaller waste gas discharge opening 4 of the rotor converter 1 with the interpolation of an air entry space or slit 3 which is axially adjustable. The other end of pipe 2 is connected by an elbow pipe 5 to a cinder and slag-collecting chamber 6 having a flue gas outlet 7. The outlet 7 discharges the flue gases to a heat exchanger (not shown) in which the heat is extracted from the fully burnt gases whereby highest heat efficiencies are obtained.

In the example given the waste gas pipe 2 is adjustably arranged by means of a suspension frame 8 having rollers or the like 9, engaging a fixed beam 10 so that the pipe 2 can be moved by a motor 11. The motor 11 may be operated by a control circuit so that the air entry slit 3 is regulated according to the carbon monoxide content in the waste gases issuing from the converter opening 1a. The waste gas pipe also has a refractory lining 12, while the air entry opening at 13 of pipe 2 is made funnel-shaped. The cinder or slag-collecting chamber 6, which may also be refractory lined, is stationary on a supporting frame 14, and is provided with an opening 15 permitting the movement of the mouth of the elbow pipe in the direction of the sliding of the waste gas pipe 2. Surrounding the mouth of the elbow pipe there is also a shielding flange 16, which, in spite of the sliding mentioned, ensures a sufficient tightness between the mouth of the elbow pipe and the slag-collecting chamber 6. The slag-collecting chamber 6 also has a funnel-shaped bottom 17 provided with a slide 18, through which the slag is discharged.

The apparatus of the invention operates, as well be understood, to provide enough oxygen to burn in the pipe 2 the carbon monoxide content of the hot waste gas and convert it to carbon dioxide. The hot gases, now completely burned, pass from pipe 2 into chamber 6 which removes cinders, fly ash, or the other slag and out flue 7 to the heat exchanger (not shown). The motor 11 positions pipe 2 so that the air entry slit or space 3 provides enough air for complete combustion but no excess of air which would cool the hot gases and thereby reduce the fuel efficiency of the operation.

While a certain representative embodiment and details have been shown for the purpose of illustrating the invention, it will be apparent to those skilled in this art that various changes and modifications may be made therein without departing from the spirit or scope of the invention.

What is claimed is:
1. Apparatus for effecting efficient burning of combustibles in hot waste gas including converter means having an opening for discharging the waste gas, a pipe having an opening at least the same size as said converter means opening being axially aligned therewith but spaced therefrom, means mounting the pipe for movement so that the opening thereof is moved in parallel relation to the converter means opening a selective distance to control the amount of air drawn through the space between the converter means opening and the pipe opening by the flow of waste gas through the opening and to pass only substantially sufficient air to the waste gas to burn the combustibles therein, a stationary cinder collecting chamber positioned adjacent the end of the pipe remote from the converter, means for slidably connecting the chamber to the pipe so that the chamber receives the waste gas from the pipe regardless of the position thereof relative to the converter means, said chamber having a waste gas outlet at its side, and a movable closure for the bottom of the chamber.

2. The combination defined in claim 1 wherein suspension means slidably support the pipe for movement on its axis, and motor means for moving the pipe on the suspension means to adjust the amount of air drawn through the space between the opening and the pipe.

3. The combination defined in claim 1 wherein the pipe and chamber have refractory linings.

4. The combination defined in claim 1 wherein the air entry end of the pipe is made funnel-shaped and larger than the opening in the converter means.

5. The combination defined in claim 1 wherein the chamber is vertically below the end of the pipe remote from the converter, an elbow on the pipe above the chamber, and a sliding substantially air-tight connection between the bottom of the elbow and the top of the chamber.

References Cited by the Examiner
UNITED STATES PATENTS

| | | | |
|---|---|---|---|
| 2,803,450 | 8/1957 | McFeaters | 266—15 X |
| 2,831,762 | 4/1958 | Kemmetmuller et al. | 75—60 |
| 3,002,739 | 10/1961 | Lawler | 266—35 |
| 3,022,990 | 2/1962 | McFeaters et al. | 266—36 |
| 3,111,400 | 11/1963 | Hoff | 266—35 |
| 3,118,759 | 1/1964 | Okaniwa et al. | 75—60 X |
| 3,134,835 | 5/1964 | Okaniwa | 266—35 |

FOREIGN PATENTS 822,388  10/1959  Great Britain.

JOHN F. CAMPBELL, *Primary Examiner.*

JAMES H. TAYMAN, Jr., MORRIS WOLK, *Examiners.*